Figure 1:
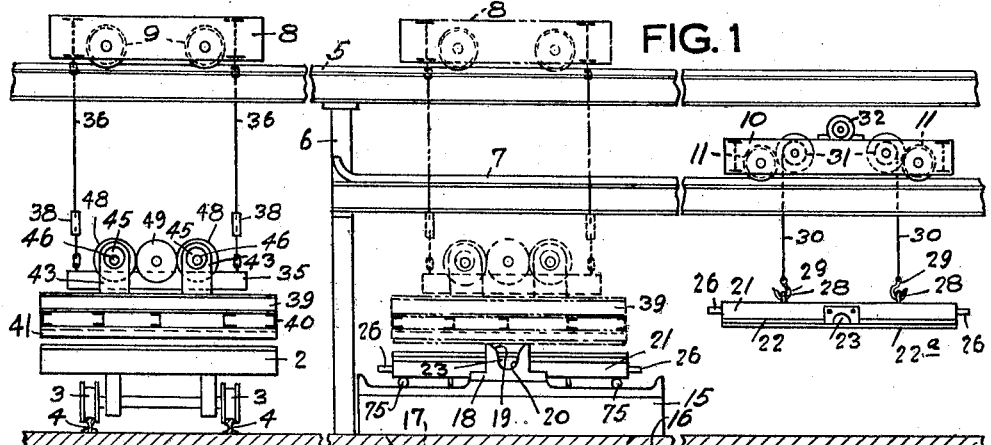

Jan. 27, 1925.

F. E. TROUTMAN ET AL 1,524,067

TURNING PLATE GLASS

Filed March 17, 1923    2 Sheets-Sheet 1

INVENTORS
Frank E. Troutman
Charles H Christie
By Kay, Totten Brown,
Attorneys

Jan. 27, 1925.　　　　　　　　　　　　　　　　　　　　　　　1,524,067
F. E. TROUTMAN ET AL
TURNING PLATE GLASS
Filed March 17, 1923　　　2 Sheets-Sheet 2
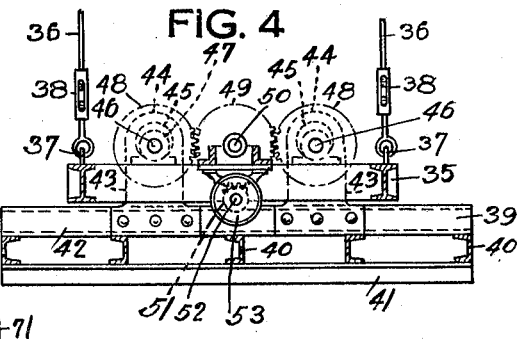
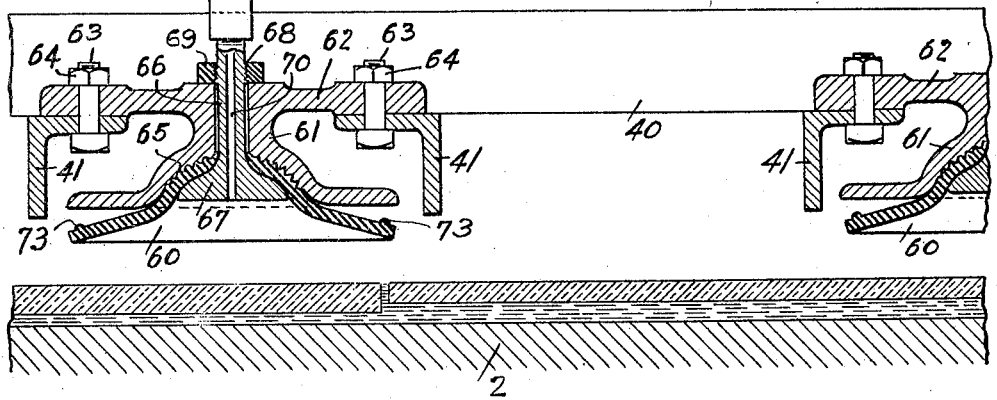
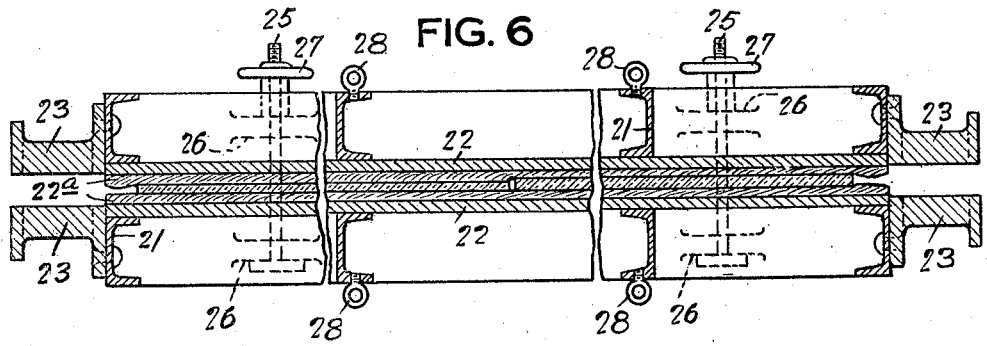
INVENTORS
Frank E. Troutman and
Charles N Christie
By Kay, Totten & Brown,
Attorneys Patented Jan. 27, 1925.

1,524,067

UNITED STATES PATENT OFFICE.

FRANK E. TROUTMAN AND CHARLES H. CHRISTIE, OF BUTLER, PENNSYLVANIA.

TURNING PLATE GLASS.

Application filed March 17, 1923. Serial No. 625,901.

*To all whom it may concern:*

Be it known that we, FRANK E. TROUTMAN and CHARLES H. CHRISTIE, citizens of the United States, and residents of Butler, in the county of Butler and State of Pennsylvania, have invented a new and useful Improvement in Turning Plate Glass; and we do hereby declare the following to be a full, clear, and exact description thereof.

Our invention relates to the grinding and polishing of plate glass and other kinds of flat glass, and it has special reference to that portion of the grinding and polishing process wherein the glass, after having been ground or polished on one side, is turned over and prepared to have its other side ground or polished.

The object of our invention is to provide an improved method of turning flat glass whereby an entire table of glass, consisting of either one large plate or several smaller plates, may be turned in one operation and without changing the relative arrangement of the pieces of glass.

In carrying out our process, the glass which has been ground or polished on one side is loosened from the plaster which holds it upon the grinding or polishing table, and a suction lifter is then brought above the glass and is caused to lift the glass from the table. The suction lifter is then moved to transfer the glass to one section of a double inverting table which is mounted on trunnions and preferably has its upper surface covered with soft material to receive the glass. After depositing the glass upon the inverting table the suction lifter is removed and another table, similar to the table which now supports the glass, is brought over the first inverting table and is placed upon the glass after which the two inverting tables are fastened together by means of suitable clamps and are given a half-rotation on their trunnions so as to bring uppermost the table which first supported the glass when received from the suction lifter. The clamps are released, the uppermost inverting table is removed, and the suction lifter is again brought into position to raise the inverted glass and transport it back to the grinding or polishing table which has been provided with the usual plaster coating.

The suction lifter employed in the process outlined above may be of the construction described and claimed in our copending application for Letters Patent filed January 20, 1923, Serial No. 613,948. The method of transferring the glass by suction means is described and claimed in our application for Letters Patent filed January 20, 1923, Serial No. 613,949.

Figure 2:
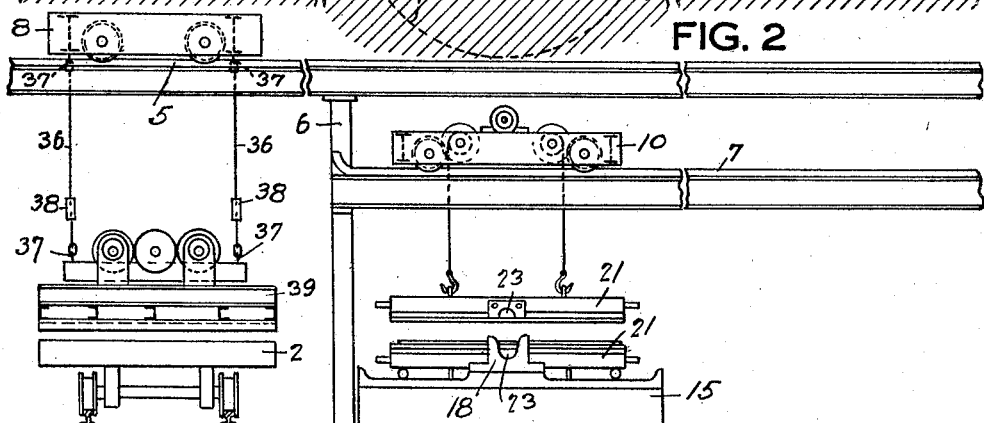
Figure 3:
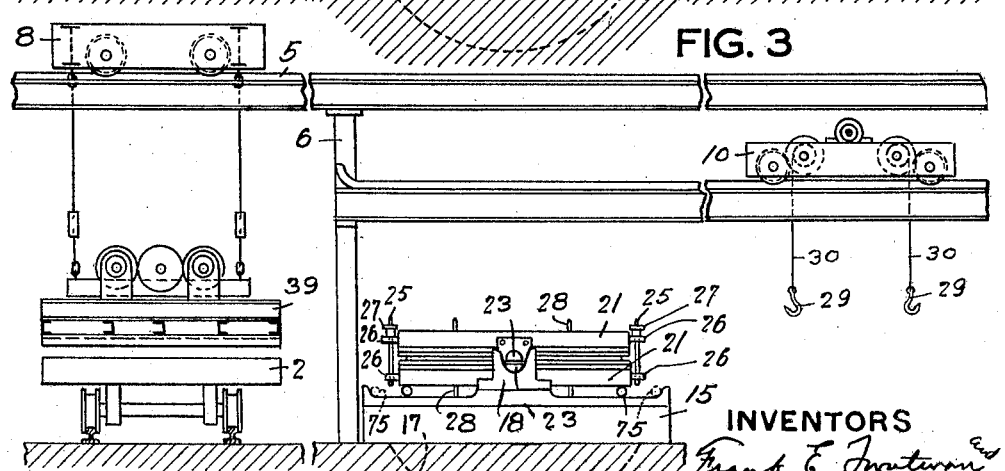

The accompanying drawing shows the essential features of apparatus adapted for carrying out our present invention. Fig. 1 is a side elevational view, with parts in section, showing a grinding or polishing table, a pair of inverting tables, a suction lifter, and the cranes which operate the suction lifter and the inverting tables; Fig. 2 is a similar view showing the position of the parts when the upper inverting table is being placed upon the lower inverting table; Fig. 3 is a similar view showing the inverting tables clamped together and ready to be swung upon their trunnions; Fig. 4 is an enlarged side elevational view of the suction lifter; Fig. 5 is a still more enlarged fragmentary vertical elevation of a portion of the suction lifter, showing the construction of the suction cups; and Fig. 6 is an enlarged longitudinal sectional view through the assembled inverting tables with a set of pieces of glass clamped between them.

In the drawing the numeral 2 indicates a grinding or polishing table for flat glass, this table being provided with wheels 3 running on tracks 4. A pair of overhead tracks 5 is mounted on supports 6 and extends across the tracks 4. A second pair of overhead tracks 7 is also mounted on the supports 6 at a lower level than the tracks 5.

A crane 8, provided with wheels 9 running on the upper tracks 5, is arranged to travel between the full-line position shown in Fig. 1, where it is above the tracks 4, to the position shown in dotted lines, Fig. 1, where it is above the inverting device which will be described below. A crane 10, having wheels 11 running on the lower overhead tracks 7 is provided for handling the sections of the inverting table, and for this purpose travels between the position shown in Fig. 1 and the position shown in Fig. 2. The cranes 8 and 10 are provided with the usual motors and gearing for moving the cranes in their tracks, these motors and gearing being omitted from the present drawing as they form no part of our invention.

The inverting mechanism is mounted upon a supporting frame 15 which rests upon a foundation 16 and contains an open space which permits the inverting table to rotate. This space may extend into the foundation 16, as indicated by dotted lines 17. The supporting frame 15 carries a pair of bearings 18 having open tops and having inclined surfaces 19 which guide the trunnions of the inverting tables into the bearing recesses 20.

The construction of the double inverting table is best shown on Fig. 6. It consists of two similar halves, each including a rectangular frame composed of channel bars 21, a platform 22 carried by the channel bars 21, and a pair of half-trunnions 23 extending from opposite sides of the frame midway between its ends. The platforms 22 may be covered, as shown at 22ª, with soft material such as felt, which yields when the sections of the inverting table are clamped together and enables the glass to be held tightly but without danger of breaking, even though the pieces of glass may not be of exactly the same thickness.

Clamps for securing the two halves of the inverting table together are shown on Fig. 6 and consist of pivoted bolts 25 adapated to enter sockets in brackets 26 and provided with hand wheels 27. Each half section of the inverting table is provided with four eye-bolts 28 into which hooks 29, suspended from cables 30 carried by the crane 10, may be inserted for lifting and transporting the inverting table sections. The cables 30 pass over drums 31 carried by the crane 10, and these drums may be geared to an electric motor 32.

The construction of the suction lifter as carried by the crane 8 is best shown on Figs. 4 and 5. It includes a rectangular frame 35 suspended from the crane 8 by means of rods 36 which are provided at their upper and lower ends with eyes engaging eye-bolts 37 or the like carried by the crane 8 and by the drum 35, respectively. The vertical length of the rods 36 is made adjustable by means of turn-buckles 38. This arrangement provides for a certain amoununt of horizontal swinging movement of the frame 35, while maintaining this frame always level.

The frame 35 carries another frame 39 which is movable vertically with respect to the frame 35 and carries a series of vacuum cups arranged to lift and transport the pieces of glass to and from the inverting tables. Angle bars 41 are arranged in pairs beneath the longitudinal bars 40. Other transverse bars 42 are secured to the upper flanges of the channel bars 40 and serve to support suspension members 43 which carry bearings 44 provided at their upper ends with circular seats in which are received eccentrics 45 carried by horizontal shafts 46 that are mounted in bearings 47 carried by the frame 35. The shafts 46 also carry spur gear wheels 48 meshing with an intermediate gear wheel 49 on a shaft 50. The gear wheel 49 meshes with a pinion 51 on the armature shaft 52 of an electric motor 53 which is suspended beneath transverse angle bars 54 forming part of the frame 35.

The motor and gearing just described provide means for raising and lowering the frame 39 which carries the vacuum cups. When the motor 53 is started the pinion 51 acts through the gear wheel 49 to rotate the gear wheels 48 and consequently the shafts 46 and the eccentrics 45, thus changing the angular position of the eccentrics 45 and raising or lowering the frame 39.

The transverse angle bars 41 of the frame 39 support a set of vacuum cups and also determine the upper level of the glass that is lifted by the vacuum cups, the cups being supported upon the upper horizontal flanges of the bar 41 while the lower horizontal flanges of these parts serve as limiting stops to fix the upper level of the glass.

Each of the vacuum cups, as shown on Fig. 5, is of the construction described and claimed in our prior application, Serial No. 613,948, and consists of a suction cup 60 composed of rubber or other elastic material and carried by a rigid housing 61 which conforms to the shape of the rubber cup 60 and is suspended from a plate 62 which extends across the space between a pair of the angle bars 41 and is removably fastened to the upper flanges of these bars by means of bolts 63 and nuts 64. The under surface of the hollow central portion of the housing 61 may be provided with saw-tooth grooves 65, in order to prevent relative movement between the rubber cup 60 and the housing 61 when the apparatus is in use. The rubber cup 60 is removably secured within the housing 61 by means of a stem 66 having an enlarged head 67 and a screw-threaded outer portion 68 to which is applied a nut 69. The stem 66 has a central channel 70 which communicates with a pipe 71 controlled by a valve 72 and connected to a suitable source of suction. The upper surface of the rubber cup 60 is provided with one or more annular ribs 73 near its upper edge. This rib acts as a sealing ring when the cup is forced down upon the glass, and insures that proper suction will be produced, even though the upper surface of the glass may be slightly wavy or rough. The suction cups are connected by suitable pipes to a vacuum pump which is preferably carried by the frame 39 in the manner shown in our prior applications mentioned above.

Plate glass and other forms of flat glass are usually ground and polished upon tables such as the table 2 shown in the accompanying drawing; the glass being held upon the surface of the table by means of plaster of Paris. When one side of each table of glass has been ground it is necessary to detach the glass from the table, invert the glass, and secure it on a fresh coating of plaster upon the original table or upon another table, after which the grinding operation is repeated. Similar steps are required in polishing glass after it has been ground.

In using the apparatus described above for inverting flat glass which has been ground or polished on one side, the glass is detached from the grinding or polishing table in the usual manner, which consists in inserting a tool between the glass and the table, raising the glass slightly, and directing a blast of compressed air between the table and the glass which loosens all parts of the glass from the plaster. In carrying out our present invention the glass is thus loosened without removing the individual pieces of glass if several pieces are arranged upon the same table. When the glass has been loosened the crane 8 is operated to bring the suction lifter above the table, as shown at the left of Fig. 1 in the drawing. The motor 53 is started, thus lowering the frame 39 until the rubber cups 60 engage the upper surfaces of the pieces of glass which are indicated at A, Fig. 5. The motor is then stopped and the vacuum connections are opened so as to produce suction in all of the suction cups simultaneously. The suction thus applied to the glass draws the glass vertically until the upper surfaces of the glass engage the lower edges of the angle bars 41. The motor 53 may then be started in the reverse direction to raise the frame 39 to its starting position, or at least to such a position that the glass is free from the table. The crane 8 is then moved on the tracks 5 to the dotted line position shown in Fig. 1, and the motor 53 is again started in the proper direction to lower the frame 39 and deposit the glass upon the lower half of the inverting table. At this time the upper half of the inverting table has been moved to the right, as shown at the right of Fig. 1, and the lower half of the inverting table is held against rotation by means of two bars or pipes 75 which extend temporarily across the frame 15 beneath the ends of the inverting table.

When the glass has been placed upon the lower half of the inverting table the suction is cut off from the vacuum cups, the frame 39 is raised, and the crane 8 is moved aside. The crane 10 then brings the upper half of the inverting table to a position above the lower half, as shown on Fig. 2, the half-trunnion 23 of the upper half being guided into proper position by the inclined surfaces 19 of the open bearings 18. The hooks 29 are detached from the eye-bolts 28 and the crane 10 may be moved aside, as shown on Fig. 3. The two halves of the inverting table are clamped together, as shown on Figs. 3 and 6, and the bars or pipes 75 are removed, leaving the inverting table free to swing upon its trunnions. The inverting table may be unbalanced slightly to one side, in order to start the rotation of the table by gravity. When the inverting table has been turned over, the bars or pipes 75 are again inserted beneath the ends of the table, the clamps are detached, and the crane 10 is caused to lift the half of the inverting table which is now uppermost, leaving the glass inverted but with the several pieces of glass in the same relative position as before. The suction frame is then brought by the crane 8 to the position shown in dotted lines on Fig. 1 and the suction cups are again lowered into contact with the glass. The cups are connected with the source of suction, the glass is lifted, and the crane 8 transports the glass back to a position above the table 2, which has meanwhile been prepared with a fresh coating of plaster of Paris. The glass is lowered into contact with the plaster of Paris and the frame which carries the glass is swung horizontally by hand for the purpose of forcing the air from beneath the glass, as in the ordinary operation of swimming plate glass upon plaster. The swinging frame is then allowed to remain stationary until the plaster is set sufficiently to support the glass, after which the vacuum is released and the frame 38 is raised, leaving the glass upon the table ready to be ground or polished.

The method described above may be employed in turning a single large plate of glass, but it is of special advantage in simultaneously turning a whole table of smaller plates without the necessity of handling each individual plate. This not only saves time, labor and expense, but also insures that a table of glass, when once arranged and matched upon an assembling table, shall always be kept in the same relative arrangement throughout the several grinding and polishing operations.

While we have shown and described apparatus which is well suited for carrying out our invention, it is to be understood that our invention is not restricted to the use of the apparatus herein shown, but may be carried out in various modified ways without departing from our invention.

We claim as our invention:

1. The method of turning a plurality of pieces of flat glass without changing their relative arrangement, that comprises lifting the pieces of glass simultaneously by means of suction, placing the said pieces of glass simultaneously upon a support, placing another support upon said glass, inverting the said supports, removing the uppermost support, lifting said pieces of glass simultaneously from the lower support by means of suction, and depositing said glass upon a grinding or polishing table.

2. The method of turning a plurality of pieces of flat glass without changing their relative arrangement, that comprises lifting the pieces of glass simultaneously and in a horizontal position, placing said pieces of glass simultaneously upon a horizontal support, placing another support on said glass, inverting said supports by rotating them upon a horizontal axis, removing the uppermost support, lifting said pieces of glass simultaneously from the lower support, and depositing said pieces of glass simultaneously upon a grinding or polishing table.

3. The method of turning a plurality of pieces of flat glass without changing their relative arrangement, that comprises lifting the pieces of glass simultaneously and in a horizontal position by means of suction applied to the upper surfaces of the glass simultaneously, placing said pieces of glass upon a horizontal support, placing another support upon said glass, clamping the said supports together, inverting said supports by rotating them upon a horizontal axis, releasing and removing the uppermost support, lifting said pieces of glass simultaneously from the lower support by means of suction applied to their upper surfaces and depositing said glass upon a grinding or polishing table.

4. The method of turning flat glass which has been ground or polished on one side that comprises loosening the glass from a grinding or polishing table, lifting the glass from said table by means of suction applied to the upper surface of glass, placing the glass upon a horizontal support, placing another support on said glass, clamping said supports together, inverting said supports by rotating them on a horizontal axis, removing the uppermost support, lifting said glass from the lower support by means of suction applied to the upper surface of the glass, and depositing said glass upon a grinding or polishing table.

5. The method of simultaneously turning, without changing their relative arrangement, a plurality of pieces of flat glass that have been ground or polished on one side, that comprises loosening the glass from a grinding or polishing table, simultaneously lifting the pieces of glass by means of suction applied to their upper surfaces, placing the glass upon a horizontal support, placing another support on said glass, securing said supports together, inverting said supports by rotating them on a horizontal axis, removing the uppermost support, lifting the pieces of glass simultaneously by means of suction applied to their upper surfaces, and depositing the said pieces of glass simultaneously upon a plaster-coated grinding or polishing table.

In testimony whereof we the said FRANK E. TROUTMAN and CHARLES H. CHRISTIE have hereunto set our hands.

FRANK E. TROUTMAN.
CHARLES H. CHRISTIE.